(12) United States Patent
Boemler

(10) Patent No.: US 6,818,877 B2
(45) Date of Patent: Nov. 16, 2004

(54) PRE-CHARGING A WIDE ANALOG BUS FOR CMOS IMAGE SENSORS

(75) Inventor: Christian Boemler, Cortland, NY (US)

(73) Assignee: Silicon Video, Inc., Ithaca, NY (US)

( * ) Notice: Subject to any disclaimer, the term of this patent is extended or adjusted under 35 U.S.C. 154(b) by 91 days.

(21) Appl. No.: 10/151,220

(22) Filed: May 17, 2002

(65) Prior Publication Data

US 2002/0171034 A1 Nov. 21, 2002

Related U.S. Application Data

(60) Provisional application No. 60/291,402, filed on May 17, 2001.

(51) Int. Cl.[7] .............................................. H01L 27/00

(52) U.S. Cl. ................................ 250/208.1; 250/214 A

(58) Field of Search ........................ 250/214 A, 208.1, 250/241 A; 327/514; 330/308; 348/300, 308, 310, 241

(56) References Cited

U.S. PATENT DOCUMENTS

| 5,892,540 | A | * | 4/1999 | Kozlowski et al. | ......... 348/300 |
| 5,898,168 | A | * | 4/1999 | Gowda et al. | ........... 250/208.1 |
| 5,900,623 | A | * | 5/1999 | Tsang et al. | ............. 250/208.1 |
| 6,084,229 | A | * | 7/2000 | Pace et al. | ................ 250/208.1 |
| 6,128,039 | A | * | 10/2000 | Chen et al. | .................. 348/294 |
| 6,493,030 | B1 | * | 12/2002 | Kozlowski et al. | ......... 348/310 |

* cited by examiner

*Primary Examiner*—Stephone B. Allen
*Assistant Examiner*—Patrick J. Lee
(74) *Attorney, Agent, or Firm*—Bernhard P. Molldrem, Jr.

(57) ABSTRACT

A video bus for an array of pixel amplifiers is designed for a minimum quiescent current draw. The pixel amplifiers (or column amplifiers) are designed with high impedance pull-ups and low impedance pull-downs to conserve over-all power dissipation. The video bus is provided with a high-impedance P-FET to reset the bus to drain voltage $V_{DD}$ for a very short time between the time one pixel (or column) is selected the time the next is selected, so that the video bus only has to be discharged through the low impedance N-FET. The bus does not have to be current-sourced by the P-FET.

7 Claims, 1 Drawing Sheet

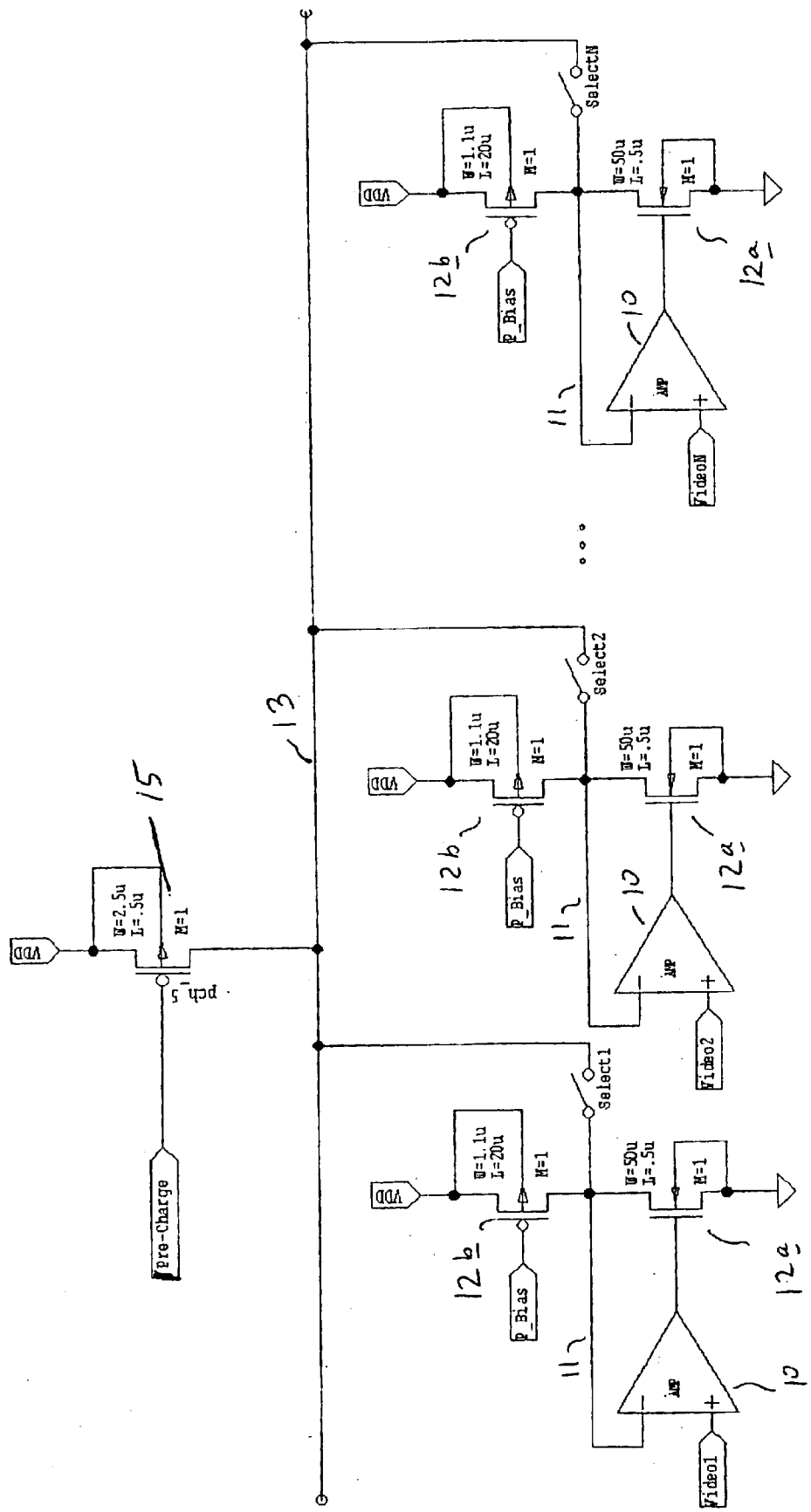

PRE-CHARGING A WIDE ANALOG BUS FOR CMOS IMAGE SENSORS

This application claims the benefit of Provisional Application No. 60/291,402, filed May 17, 2001.

BACKGROUND OF THE INVENTION

This invention concerns means of pre-charging an analog bus in-between the selection periods to speed up the bus, minimize supply current in video bus driver circuit and reduce the physical size of arrayed analog driver circuitry. The invention concerns solid state imagers, and in particular is directed to an arrangement for obtaining high uniformity and improved image quality and reliability. Solid state image sensors are used in a wide variety of applications, and there has been much interest in pursuing low-cost, high-reliability image sensors. CMOS technology is well suited for imagers that are intended for portable applications, because of their need for a only a single power supply voltage, their ruggedness, and their inherent low power consumption. There has been great interest in achieving extremely high resolution also.

DESCRIPTION OF THE PRIOR ART

An active column sensor (ACS) architecture has recently been developed, as disclosed in Pace et al. U.S. Pat. No. 6,084,229, and which permits a CMOS image sensor to be constructed as a single-chip video camera with a performance equal to or better than that which may be achieved by CCD or CID imagers.

The majority of the current image sensors designs use one or more analog bus(ses) in order to sequentially scan the signals stored in a very large array. Wide-bus analog multiplexing has significant problems with highly capacitive loads and noise cross coupling from neighboring circuits. A surge in the analog current from charging and discharging the bus, can inject a significant amount of noise to the extremely sensitive pixel-site or pixel amplifier voltage storage nodes. If the arrayed analog buffer has to be able to drive the capacitive bus (even at moderate speeds) it will need a higher quiescent supply current in the output stage and that current gets multiplied by the number of arrayed elements to yield a very high undesired power consumption for the entire array.

A conventional analog bus driver design consists of a push-pull stage with a constant current source or resistor from drain voltage supply $V_{DD}$ and an N-FET stage going to ground where the gate voltage of the N-FET stage is regulated to achieve a desired output voltage. The output voltages from all the analog bus drivers in the array are sequentially selected onto the bus by a transmission gate signal in order to read out all the signals from the arrayed drivers. This construction needs to be able to source a current to be able to pull the analog video bus to voltage that is higher than the previous voltage and so that there is a quiescent current when the bus driver is not selected onto the analog bus. With any arrayed devices, a quiescent current gets multiplied by the number of elements in the array and produces an undesirable high current draw.

OBJECTS AND SUMMARY OF THE INVENTION

Accordingly, it is an object to provide a high quality output bus for a video array and at the same time to keep the quiescent current to a minimum.

It is an object to provide an bus and bus driver design that is of straightforward construction.

The Invention is straightforward: Quiescent power consumption of the arrayed circuits is reduced to an absolute minimum. A dead-band occurs between the time when any one of the transmission gates are closed and the time the next is closed (break-before-make), and in that short time the highly capacitive analog bus is pulled high by a P-FET to drain voltage $V_{DD}$ and this is achieved using a simple digital control (for instance, NOR-ing the two-phase clock used for readout). This means that the array drivers do not need to source current to the highly capacitive analog bus in order to drive it to a higher voltage. Consequently, a much lower quiescent power consumption is possible for the entire device.

According to an aspect of the invention, an analog bus for a solid state video imager, comprises a) one or more conductive channels; b) a plurality of column output amplifiers, each connected with a selected pixel of its associated column, and having a low-impedance amplifier device; c) switching means for selectively connecting outputs of the column amplifiers to said one or more conductive channels; and d) a pre-charging high-impedance pull-up amplifier periodically charging up the one or more conductive channels between connections of said switching means.

The invention will be more fully understood from the ensuing description of a preferred embodiment, when read in connection with the accompanying Drawing.

BRIEF DESCRIPTION OF THE DRAWING

The sole FIGURE shows a portion of the column output amplifier circuits, and video bus, and a pre-charging amplifer, with a P-channel CMOS high-impedance pull-up amplifer and each pixel or column output circuit having an low-impedance N-channel pull-down circuit.

DETAILED DESCRIPTION OF THE PREFERRED EMBODIMENT

The sole Drawing FIGURE illustrates an embodiment of this invention, in which there are an array of pixels which are configured in a number of columns, each having one or more pixels, i.e., defining rows. In this case, there are a plurality of pixel or column amplifiers 10, 10, etc., each with a respective video input, Video1, Video2 . . . VideoN, applied to one input, and with a feedback input loop 11. The output of the amplifier 10 has an output going to a push-pull bus driver that is formed of N-FET 12a and a current sourcing FET 12b. The output or drain side of the N-FET 12a is connected through a column select switch Select1, Select2, . . . SelectN, respectively, to the analog bus 13, and also through the feedback loop 11 to an input of the associated amplifier 10.

Pixel amplifiers are designed with high impedance pull-ups and low impedance pull-downs to conserve over-all power dissipation. The bus 13 is provided with a high-impedance P-FET 15 to reset the bus to $V_{DD}$ for a very short time between the time one pixel (or column) is selected the time the next is selected, so that the video bus only has to be discharged through the low impedance N-FET. The bus 13 does not have to be current-sourced by the P-FET 15.

Instead of pulling "up" to $V_{DD}$, it would be equivalent design for the amplifier 15 to pre-charge to ground or to a negative voltage, and have the low-impedance drivers charge the video bus 13 to a more positive level.

While the invention has been described with reference to a preferred embodiment, it should be understood that many modifications and variations are possible without departing from the scope and spirit of the invention, as defined in the appended Claims.

I claim:

1. Analog bus for a solid state video imager, comprising
   a) one or more conductive channels;
   b) a plurality of column output amplifiers, each connected with a selected pixel of its associated column, and having a low-impedance amplifier device;
   c) respective switching means for selectively connecting outputs of the column amplifers to said one or more conductive channels; and
   d) a pre-charging high-impedance pull-up amplifier coupled to said one or more conductive channels for periodically charging up the one or more conductive channels between connections of said switching means.

2. Analog bus according to claim 1, said pull-up amplifier including a P-FET.

3. Analog bus according to claim 1, said pull-up amplifier including means providing a gating signal that occurs between times of actuation of the respective switching means.

4. Analog bus according to claim 2 wherein said P-FET has a predetermined PRE-CHARGE bias applied to a gate terminal thereof.

5. In a solid state video imager of the type that comprises an array of pixels arranged into a plurality of successive columns, with each said column including a column amplifier with a video input coupled to the pixels of the respective column, an output, and a respective column switch; and a video output bus comprising one or more conductive channels, with the column select switches periodically connecting the outputs of the column amplifiers to the one or more conductive channels of the video output bus; the improvement wherein the video output bus further includes a pre-charging high-impedance pull-up amplifier periodically charging up the one or more conductive channels of said output bus between actuations of said column select switches.

6. The imager as set forth in claim 5 wherein said pull-up amplifer includes a P-FET pull-up amplifier.

7. The imager as set forth in claim 6 wherein said P-FET has a predetermined PRE-CHARGE bias applied to a gate terminal thereof.

* * * * *

US006818877C1

(12) INTER PARTES REEXAMINATION CERTIFICATE (0431st)
United States Patent
Boemler

(10) Number: US 6,818,877 C1
(45) Certificate Issued: Aug. 21, 2012

(54) PRE-CHARGING A WIDE ANALOG BUS FOR CMOS IMAGE SENSORS

(75) Inventor: Christian Boemler, Cortland, NY (US)

(73) Assignee: Credit Suisse, New York, NY (US)

Reexamination Request:
No. 95/000,521, Dec. 8, 2009

Reexamination Certificate for:
Patent No.: 6,818,877
Issued: Nov. 16, 2004
Appl. No.: 10/151,220
Filed: May 17, 2002

Related U.S. Application Data
(60) Provisional application No. 60/291,402, filed on May 17, 2001.

(51) Int. Cl.
*H01L 27/00* (2006.01)

(52) U.S. Cl. .................. 250/208.1; 250/214 A; 348/E3.021

(58) Field of Classification Search .................. None
See application file for complete search history.

(56) References Cited

To view the complete listing of prior art documents cited during the proceeding for Reexamination Control Number 95/000,521, please refer to the USPTO's public Patent Application Information Retrieval (PAIR) system under the Display References tab.

*Primary Examiner* — Pia Tibbits

(57) ABSTRACT

A video bus for an array of pixel amplifiers is designed for a minimum quiescent current draw. The pixel amplifiers (or column amplifiers) are designed with high impedance pull-ups and low impedance pull-downs to conserve over-all power dissipation. The video bus is provided with a high-impedance P-FET to reset the bus to drain voltage $V_{DD}$ for a very short time between the time one pixel (or column) is selected the time the next is selected, so that the video bus only has to be discharged through the low impedance N-FET. The bus does not have to be current-sourced by the P-FET.

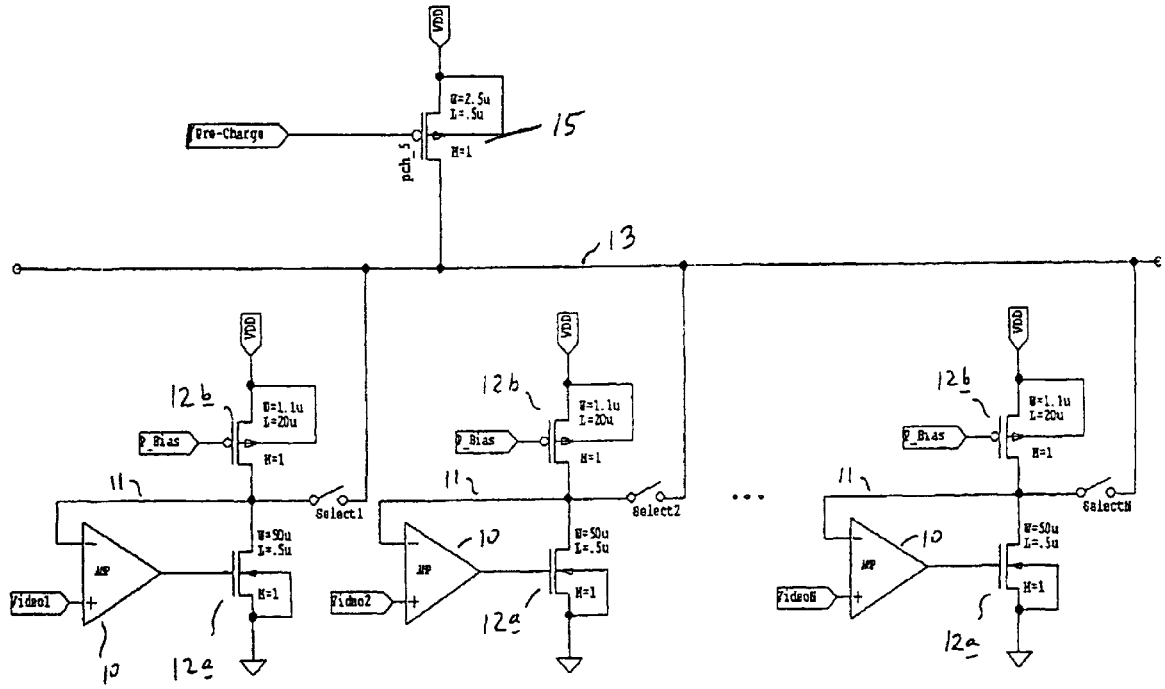

INTER PARTES REEXAMINATION CERTIFICATE ISSUED UNDER 35 U.S.C. 316

NO AMENDMENTS HAVE BEEN MADE TO THE PATENT

AS A RESULT OF REEXAMINATION, IT HAS BEEN DETERMINED THAT:

The patentability of claims 1-4 is confirmed.

Claims 5-7 were not reexamined.

* * * * *